United States Patent
Remane

[11] 3,812,645
[45] May 28, 1974

[54] METHOD OF FILLING CONTAINERS WITH PRESSURIZED FLUID AND CLOSING BY MEANS OF A DISCHARGE VALVE ASSEMBLY

[75] Inventor: Roger Remane, Sainte-Colombe-les-Vienne, France

[73] Assignee: Application Des Gaz, Paris, France

[22] Filed: May 2, 1973

[21] Appl. No.: 356,464

Related U.S. Application Data

[60] Division of Ser. No. 215,306, Jan. 4, 1972, Pat. No. 3,776,427, which is a continuation-in-part of Ser. No. 886,242, Dec. 18, 1969, Pat. No. 3,735,903.

[52] U.S. Cl. .................................... 53/37, 53/88
[51] Int. Cl. ......................................... B65b 31/02
[58] Field of Search ............ 53/7, 36, 37, 88; 141/3, 141/20; 222/394, 402.16, 402.24

[56] References Cited
UNITED STATES PATENTS

| | | | |
|---|---|---|---|
| 2,947,904 | 8/1960 | Focht | 53/37 |
| 3,348,742 | 10/1967 | Assalit | 222/394 |
| 3,477,195 | 11/1969 | Chambers | 53/37 |

*Primary Examiner*—Robert L. Spruill
*Attorney, Agent, or Firm*—Alexander & Dowell

[57] ABSTRACT

Method for filling and closing a container filled with a pressurized fluid and closed by a valve, said valve being formed mainly by two pieces, one rigid piece being in the form of a cup embedded inside an aperture of the container above the other piece formed of elastomer material, which, on the one hand, forms a watertight assembly joint by a peripheral portion pressed between rigid cup and the edge of said aperture, and, on the other hand, forms a seat with a central portion applied against an annular portion of the rigid piece; a valve flap between the two said portions which is traversed by at least one porthole for fluid passage; said pieces resting upon the outer wall of container by peripheral superposed flanges, and wherein the flange of the elastomer piece overlaps the outer wall of the container beyond the periphery of the flange of the rigid piece to form around it an annular watertight joint, suitably centered with respect to a tubular filling mouthpiece adapted to be pressed axially against the container.

3 Claims, 7 Drawing Figures

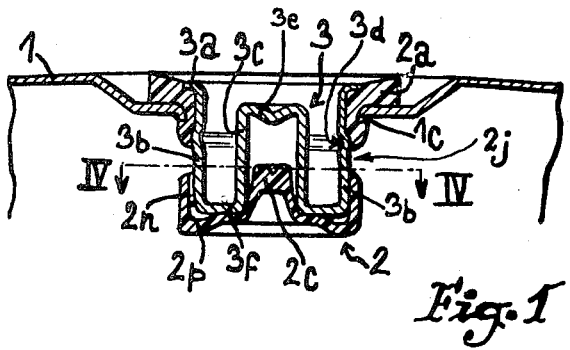
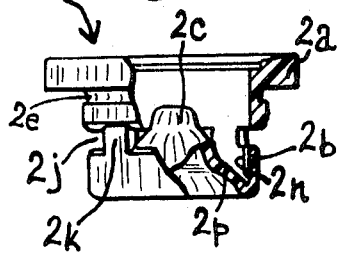
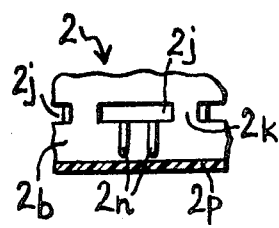
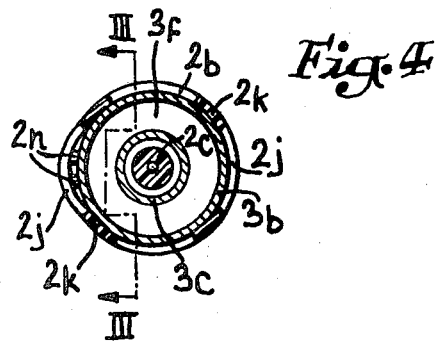
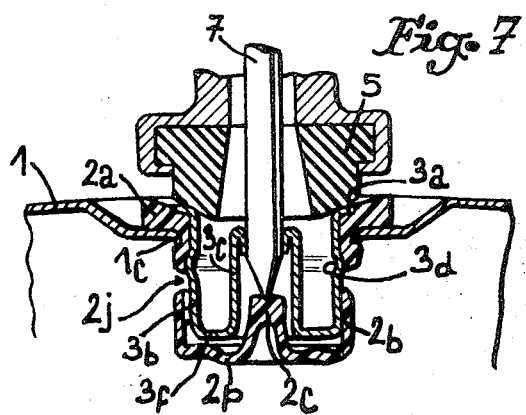

METHOD OF FILLING CONTAINERS WITH PRESSURIZED FLUID AND CLOSING BY MEANS OF A DISCHARGE VALVE ASSEMBLY

CROSS REFERENCE TO RELATED APPLICATION

This application is a division of application Ser. No. 215,306, filed Jan. 4, 1972 and now U.S. Pat. No. 3,776,427 which is a continuation-in-part of application Ser. No. 886,242, filed Dec. 18, 1969 and now U.S. Pat. No. 3,735,903.

The present patent application is concerned with a method of manufacturing containers filled with a fluid under pressure and provided with a valve for fluid sampling, with containers obtained this way and machines for manufacturing them.

The method according to the invention has as its object the manufacture, at particularly low production cost, not of an empty container, but of a container already filled with a fluid under pressure and consequently ready for sale, especially in the form of an exchangeable low cost disposable cartridge.

Up to the present time, when one wished to produce a container filled with a fluid under pressure and provided with a discharge valve, it was necessary first to assemble the valve and fix it to the container wall or to a part of it prior to the filling operation. That meant that the assembly of valve elements themselves and then to a container wall on the one hand, and the fillng of the latter, on the other hand, constituted two separate operations performed on separate machines, and, in principle, by different people.

The object of the invention is to combine the two operations into one, performed on one and the same machine, thus eliminating one of the machines, the people necessary for its operation and maintenance, and saving a great deal of time necessary for package manufacturing and the filling operation.

According to another object of the invention, without additional cost for every new filling, a new connecting joint is used, which is at normal room temperature, and thus always having all the desirable qualities with regard to its shape, elasticity and flexibility between the filling socket and container, and which, in addition, entirely avoids tying up the filling machine for the purpose of replacing the filling joints.

The container manufacturer should, in addition, for obvious safety reasons and also for establishing the lowest profitable sale price, try to prevent in advance a further filling of a once emptied container by a third party.

An important object of the invention consists of foiling any attempt, for example by a third party, of further reasonable filling under high pressure through the valve discharge conduit, by a particular arrangement of valve elements.

Another object of the invention consists of designing the valve elements in such a way that they can be manufactured without the high cost of precision machining, adjustment, or fitting, so that after mounting the valve its output is limited to a small amount, just sufficient for sampling purposes, but quite insufficient for allowing an economic filling of a once emptied container by performing this filling from the outside through the valve.

Further objects and advantages of the invention will be in part obvious and in part specifically referred to in the description hereinafter contained, which taken in conjunction with the accompanying drawings discloses a preferred form of a pressurized container comprising a valve device constructed to operate in accordance with the invention, a filling machine constructed to operate in accordance with the invention, a filling machine constructed to operate in accordance with the filling method according to the invention; the disclosure, however, should be considered as merely illustrative of the principles of the invention in its broader aspects. In the drawings:

FIG. 1 shows, in axial section view through its sampling valve, a portion of a container constructed according to the invention;

FIG. 2 is partially a vertical and partially a cross-section view of an element forming the valve portion shown in FIG. 1;

FIG. 3 shows a portion of the element shown in FIG. 2 cut along III—III (FIG. 4);

FIG. 4 is a section view along IV—IV (FIG. 1);

FIG. 7 shows an axial section view of a container portion shown in FIG. 1, assumed to contain the pressurized liquefied gas butane and used as a space container on a lighting, heating or cooking apparatus, particularly for camping, with only a portion of its fitting shown.

Figure 5:
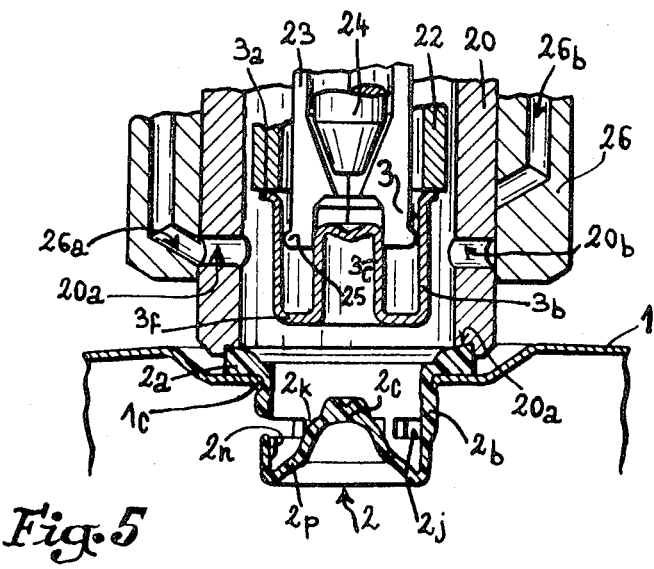
FIGS. 5 and 6 show an axial section view in two successive operation phases, of the characteristic elements according to the invention, of a machine arranged particularly to operate in accordance with the method according to the invention for the purpose of manufacturing and filling containers, such as shown in FIG. 1.

The co-pending patent application Ser. No. 886,242, filed on Dec. 18, 1969, describes a container 1 with a valve consisting specifically of two pieces 2 and 3, having approximately the shape of cups imbedded in the container aperture 1c.

Cup 2 is made of an elastomer material while cup 3 is of rigid material, in particular of metal. Both cups rest against the outside surface of the container through superposed peripheral flanges 2a and 3a, respectively. Both cups are secured to the container by an expansion at 3d of cup 3 which is expanded at its periphery under the edge of aperture 1c of the container. Thus, cup 2 constitutes, on the one hand, a sealing joint of the valve in the container, and on the other hand, a mobile flap of a valve at the entry of a rigid cup boss 3c applied against an annular portion 3f of the rigid cup forming the seat by a central portion 2c. Cup 2, between its central portion 2c and its peripheral portion, compressed between the rigid cup 3 and the edge of aperture 1c, is crossed by at least one porthole 2j through which the pressurized fluid in container 1 can flow from it into boss 3c when flap 2c is pushed into container.

The container 1, filled for example with a pressurized combustible liquified gas such as butane gas, can serve as a spare container on an appliance such as, for example, the one described in U.S. Pat. No. 2,853,126, filed on July 13, 1956. After putting the spare container on such apparatus, its sampling fitting rests on the valve periphery through an annular joint 5 (FIG. 7) in order to ensure a tight connection, and punctures diaphragm 3c by an axial flat sharp-pointed needle 7, and at the end of a stroke, drives flap 2c slightly into container 1 to establish a connection with its interior.

The invention aims first at a method for manufacturing a container and providing it with a valve, 2 and 3, for sampling and for filling it with a fluid under pressure, which may be a gas propulsion aerosol or a gas which can be used directly because of its appropriate properties (butane, propane, etc.).

This method seeks to substantially reduce production costs by combining the operations of container filling, of assembly of valve elements, and closing, by the latter, of the container filling aperture.

For this purpose it is advisable, first, to arrange cup 2 in a suitable manner by making the peripheral flange 2a extend beyond the periphery of that of 3a, pertaining to the rigid cup 3, and continuing to provide it with a support on the container's external surface, so that it can form around rigid piece 3 an annular sealing suitably centered for a tubular filling fitting.

As far as the method is concerned, it consists of filling each container with a pressurized fluid through cup 2 made of elastomer material in which portholes 2j are disposed for this purpose, said cup 2 mounted beforehand in aperture 1c serves, by its peripheral flange 2a, as a connecting watertight joint with a tubular filling mouthpiece 20 (FIG. 5), in which the rigid piece 3 remains until the end of the filling operation, then, during tightening of said mouthpiece 20 against said flange 2a (FIG. 6), is pushed away from the mouthpiece, then driven into piece 2 of elastomer material, and expanded radially outward under the container wall 1b in order to ensure, by one and the same operation, a tight junction of two valve pieces and a wall of said container 1.

Figure 6:
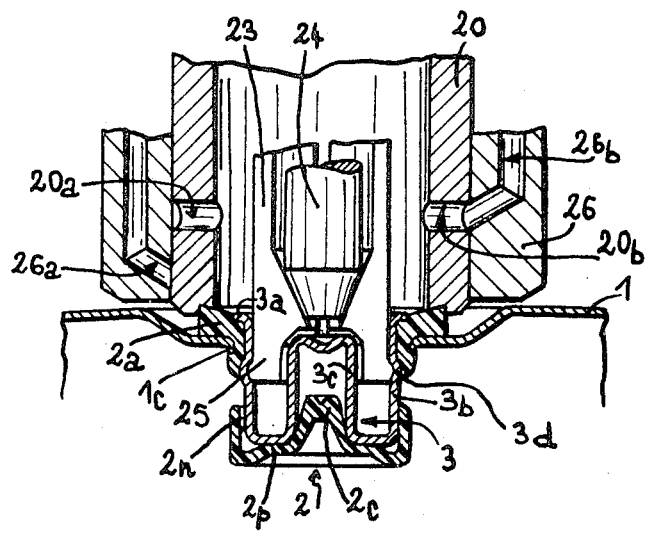

As far as the machine is concerned which serves, at the same time, for assembling the valve elements on the container and for filling the same with a pressurized fluid, it is provided, as shown in FIGS. 5 and 6, with a tubular mouthpiece 20, able to slide coaxially and tightly inside an outer axially displaceable sleeve 26. A tubular punch 22 containing a closed crown formed by prongs 23 coming out by their tips 25 at the base of punch 22, and which can be drawn apart by a central cone 24, can slide coaxially inside mouthpiece 20. A conduit 26a is disposed in sleeve 26, which, in FIG. 5, coincides with a hole 20a drilled radially in tubular mouthpiece 20. Moreover, for example on the diametrically opposite side, another conduit 26b is disposed in the tubular mouthpiece 26, which coincides with hole 20b, when sleeve 26 is raised on mouthpiece 20 upward from a position shown in FIG. 5 up to that shown in FIG. 6.

This machine is used as follows: First, cup 2 of elastomer material is set in aperture 1c of container 1, so that peripheral flange 2a comes to rest on the outer face of this aperture edge. Moreover, rigid cup 3 is introduced into filling mouthpiece 20 by forcing it on the prong tips until its peripheral flange 3a sets against the front edge of the tubular punch 22. Thus, the prong tips 25 maintain cup 3 in this position by elastically pressing against the inner face of the cylindrical portion of this cup.

Then, the container 1 is set under filling mouthpiece 20 so that its cup 2 is aligned on its sleeve axis and the mouthpiece is let down to apply its frontal edge 20a against cup flange 2a, by tightening it against the outer face of container 1. Thus one obtains a watertight connection between the mouthpiece 20 and container interiors, through portholes 2j of the elastomer cup, as shown in FIG. 5. Then, one lets the sleeve 26 go down coaxially on mouthpiece 20 to let it play its role of fluid control distributor and to let its conduit 26a pass in front of a hole 20a to establish a connection between conduit 26a and mouthpiece 20, and consequently with container 1 inside, as shown in FIG. 5.

Then the air is sucked from container 1 through the conduit 26a, dropping the container pressure to low values. Then one lowers distributor sleeve 26 into its position shown in FIG. 6, resulting in an interruption of the connection between conduit 26a and mouthpiece 20 by displacement of this conduit inlet in relation to hole 20a, and establishing a connection, on the opposite side, between conduit 26b and mouthpiece 20, through radial hole 20b in the latter. The pressurized fluid, for example a liquefied pressurized butane gas, is allowed to come through conduit 26b, which penetrates mouthpiece 20 through hole 20b, and from there penetrates into container 1 through portholes 2j of cup 2, forming a connecting joint. When container 1 is filled up, punch 22 is lowered axially into mouthpiece 20 in order to let it push rigid cup 3 down to the bottom into cup 2 made of elastomer material, and cone 24 is allowed to advance slightly beyond this position, inside the crown of prongs 23, which expand radially outward inside cup 3 producing in it a peripheral shoulder 3 d, which can, together with flange 3a, press cup 3 tightly to the edge of aperture 1c in container 1 by means of the upper portion of elastomer cup 2. Then first cone 24 is raised to disengage the tips 25 of prongs 23, which are retrieved through their common ascent with punch 22 out of rigid cup 3 to their position shown in FIG. 5. Then distributor sleeve 26 is raised from its position shown in FIG. 6 up to that shown in FIG. 5 in order to remove by suction the pressurized fluid, accumulated during the filling operation, above rigid cup 3 and inside filling mouthpiece 20 through conduit 26a and hole 20a. Then sleeve 26 is raised onto mouthpiece 20 to close conduit 26a, and disengages, by common ascent of mouthpiece 20 and sleeve 26, container 1 from under the filling machine, which is then ready to fill up another container in the manner described above.

One will note, that for a machine constructed in accordance with the invention, it is essential that the inner diameter of the tubular mouthpiece 20 be smaller than the outer diameter of peripheral flange 2a of elastomer cup 2 but larger than the overall diameter of rigid cup 3c, i.e. larger than the outer diameter of flange 3a of said cup.

Moreover, it is advantageous to arrange cups 2 and 3, making up the valve, so that one can make maximum use of the filling method in accordance with the invention.

For this purpose it is advisable first to dispose on cup 2, on the outer, nearly cylindrical face directly below its retaining flange 2a, a peripheral groove 2e (FIG. 2), which is suitable for receiving edge 1c (FIG. 1) of the container aperture, so that by forcing cup 2 into it prior to filling the container, this cup elastically interlocks in it like a press button. Thus, a perfect setting of flange 2a conveniently centered on the outer wall of the container is provided to serve as a filling joint.

Moreover, it is advisable to shape flange 2a of the elastomer cup so that its lower face, resting on a flat portion of container 1, extends into a plane normal to the cup axis, while its upper free face converges conically toward the axis and the bottom of cup 2. In addition, the frontal face of filling mouthpiece 20 is provided with a complementary profile, such as that shown in FIGS. 5 and 6, allowing it to cup the outer upper edge of flange 2a on two fairly octogonal faces, and thus to ensure, by compressing the flange in the axial direction which drives this flange radially outward, a stoppage in this direction, which completes the tightness of the junction and makes it more efficient, thus sparing flange 2a.

It is advisable, moreover, to arrange cups 2 and 3 so that they do not allow a new filling of the container, emptied previously, in accordance with a classic method, which consists of achieving it, through a retaining valve from outside, by letting the pressurized fluid flow into the container following an inverse path with respect to that used for emptying the container. For this purpose, cup 2 is provided with at least one filling aperture 2j of large section at the place where it is concealed and blocked by cup 3 when it is set in place inside cup 2 and occupies the position shown in FIG. 6, and also with a passage which stays continuously clear and whose smaller cross section is limited by requirements for pressurized fluid sampling. This latter passage may consist of a hole disposed in portion 2p of the cup bounded by its cylindrical wall 2b.

However, according to the mode of operation particularly advantageous both for manufacturing without additional cost as well as for accuracy without adjustment of this passage, it is advisable to provide said passage with at least one projection to separate slightly the cylindrical wall of cup 2 from the corresponding cylindrical wall of cup 3, between its bottom 3f and portholes 2j of cup 2. This projection may, of course, be disposed either on cup 2, as shown in the figure, or on cup 3.

In the mode of advantageous operation shown in the figure, the projection is in the form of two ribs 2n, obtained by molding on the inner face of the cylindrical portion of cup 2, which extends between the lower side of porthole 2j and bottom 2p of cup 2. Since the cup is perfectly withdrawable with ribs 2n, one can obtain the latter with great accuracy and consequently determine with accuracy the passage section reserved for the by-pass between one filling porthole of large section 2j and the cylindrical peripheral walls of cups 2 and 3, as can be seen on the left side of FIG. 7. This by-pass passage permits the discharge of the contents of container 1 with controlled output, which would be too low to allow an economic refilling of container 1 in the opposite direction through its valve.

In order to improve protection against refilling of a container by a non-authorized third party, a plurality of large-section filling holes 2j, distributed over the periphery of cylindrical wall 2b of elastomer cup 2, are advantageously provided, leaving only weak bridges and straps 2k between these holes, which may break at the first attempt at refilling with a flow rate exceeding significantly that provided for sampling. Thus, one discourages refilling by a third party of previously emptied disposable spare containers, by preventing this filling from being carried out at a flow rate sufficient to be profitable.

I claim:

1. A method for filling with pressurized fluid and for hermetically closing containers by means of a discharge valve of the type consisting essentially of two pieces including a rigid piece embedded in the container aperture above the other piece made of elastomer material, which other pieces on the one hand, forms a fluid-tight assembly joint by its peripheral portion being pressed between the rigid piece and the edge of said aperture, and, on the other hand, forms, with its central portion a flap valve applied against an annular portion of the rigid piece coacting as a valve seat with said valve flap, said other piece of elastomer material between said portions, being traversed by at least one porthole for fluid passage, the two pieces resting upon the outer wall of the container through peripheral superposed flanges; the method comprising the steps of first inserting at the one hand the rigid piece into a tubular filling mouth piece in which it would remain until the end of the filling operation and inserting at the other hand the elastomer piece in the container aperture, so that its peripheral flange having a larger diameter than the corresponding flange of said rigid piece is surrounding said aperture on the container wall to act as a connecting joint; then pressing said mouth piece against said flange of said elastomer piece; then filling the container with a pressurized fluid through said porthole for fluid passage through the elastomer piece; and then while said mouthpiece remains pressed against said flange pushing the rigid piece out of the mouthpiece and driving same into the elastomer piece and expanding the rigid piece radially outwardly under the wall of the container to ensure at the same time by this one and the same operation, fluid-tight connection between the two valve components themselves and also with the container walls.

2. A method for filling a container with a pressurized fluid through an aperture in the wall thereof, comprising the steps of mounting in the aperture an upwardly opening resilient cup having on its lip a radially directed annular flange that overlies the top surface of the wall defining the aperture, and in its side walls one or more fluid passages, placing a filling tube in sealing engagement with the flange on the resilient cup, and filling the container with pressurized fluid through the fluid passages in the resilient cup; and, before the filling tube is moved out of sealing engagement with the flange, first nesting in the resilient cup an upwardly opening metallic cup having on the edge of its lip an annular flange that engages and overlies the annular flange on the resilient cup so that both cups project through the aperture in the wall of the container, and then radially expanding the metallic cup in a region below the bottom surface of the wall defining the aperture for causing the resilient cup to seal the aperture.

3. A method for filling with pressurized fluid a container having a filling aperture and for closing this aperture by a discharge valve using for this purpose a hollow filling head having an open end with an annular edge adapted to be tightly applied around said aperture and defining on the outer side thereof a hermetically closed operating space, said method consisting in the following steps:

first placing in said operating space, in unmounted condition and in unobstructing but cooperative mutual relation with said filling aperture of the container, at least two single primary valve components, one of which comprises at least a valve seat and the other a valve flap;

thereafter introducing through said filling head pressurized fluid in the container through its unobstructed filling aperture;

then engaging said primary valve components in mutual assembling condition in said aperture of the container;

and finally sealing said primary valve components mutually assembled in said aperture by using the edge thereof as an assembly collar.

* * * * *

UNITED STATES PATENT OFFICE
CERTIFICATE OF CORRECTION

Patent No. 3,812,645                     Dated May 28, 1974

Inventor(s)                ROGER REMANE

It is certified that error appears in the above-identified patent and that said Letters Patent are hereby corrected as shown below:

In the heading of the patent (first column)

insert:

[30] Foreign Application Priority Date:

December 18, 1968, France No. 50,768

Signed and sealed this 12th day of November 1974.

(SEAL)
Attest:

McCOY M. GIBSON JR.
Attesting Officer

C. MARSHALL DANN
Commissioner of Patents